United States Patent
Lynn et al.

(10) Patent No.: US 6,829,657 B1
(45) Date of Patent: Dec. 7, 2004

(54) METHOD TO SUPPORT GENERAL ENCLOSURE WIRING WHEN ASSOCIATING SES DATA WITH PHYSICAL DEVICES ON A FIBER CHANNEL LOOP WITH SOFT ADDRESSES

(75) Inventors: James A. Lynn, Rose Hill, KS (US); Pramodh K. Mereddy, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 284 days.

(21) Appl. No.: 09/883,139

(22) Filed: Jun. 15, 2001

(51) Int. Cl.[7] .................................................. G06F 3/00
(52) U.S. Cl. ............................. 710/9; 710/10; 710/15; 710/16; 710/17
(58) Field of Search ............................ 710/8, 9, 10, 15, 710/16, 17

(56) References Cited

U.S. PATENT DOCUMENTS

| | | | | |
|---|---|---|---|---|
| 5,805,924 A | * | 9/1998 | Stoevhase | |
| 5,944,798 A | * | 8/1999 | McCarty et al. | |
| 5,954,796 A | * | 9/1999 | McCarty et al. | |
| 6,044,411 A | * | 3/2000 | Berglund et al. | |
| 6,055,228 A | * | 4/2000 | DeKoning et al. | |
| 6,105,103 A | * | 8/2000 | Courtright, II et al. | |
| 6,167,463 A | * | 12/2000 | Arp et al. | |

* cited by examiner

*Primary Examiner*—Jeffrey Gaffin
*Assistant Examiner*—Alan Chen
(74) *Attorney, Agent, or Firm*—Suiter West PC LLO (57) ABSTRACT

An apparatus comprising one or more enclosures and a controller. The one or more enclosures may each comprise one or more drives. The controller may be configured to map correctly correlating addresses to one or more drives. An advantageous aspect of the present invention is the ability to support general enclosure wiring when associating data with physical devices, such as associating SES data with physical devices on a fiber channel loop with soft addresses.

9 Claims, 6 Drawing Sheets

METHOD TO SUPPORT GENERAL ENCLOSURE WIRING WHEN ASSOCIATING SES DATA WITH PHYSICAL DEVICES ON A FIBER CHANNEL LOOP WITH SOFT ADDRESSES

FIELD OF THE INVENTION

The present invention relates generally to a method and/or architecture for supporting general enclosure wiring when associating devices on a loop generally, and more particularly, a method and/or architecture for supporting general enclosure wiring when associating SCSI enclosure service (SES) data with physical devices on a fibre channel loop.

BACKGROUND OF THE INVENTION

In a fibre channel (FC) environment with soft addressing, correlation of the physical tray/slot location of a drive to a device discovered on the loop can be difficult. The difficulties can occur for redundant array of inexpensive disks (RAID) algorithms that can result in data integrity issues. For example, if a particular drive fails, a controller turns on a fault LED to indicate to the user which drive has failed. Turning on the correct LED is critical, since the fault LED indicates which drive to replace. To turn on the fault LED in the external drive enclosure (i.e. tray), SCSI enclosure service (SES) commands are used. Thus, a correct mapping to the SES drive slot and the fibre channel device is required.

In a development of an algorithm for correct mapping of devices, specific knowledge of the internal wiring of a particular drive may not be required. This may be beneficial as it may allow multiple drive trays from multiple vendors to be accommodated. However, utilizing broad assumptions in the development of the algorithm for correct mapping of devices may not support all types of internal wiring. Consequently, a system and method of supporting general enclosure wiring when associating data with physical devices is required.

SUMMARY OF THE INVENTION

Accordingly, the present invention directed to a system and method for supporting general enclosure wiring when associating data with physical devices. In one embodiment of the invention, a method and system of the present invention may be capable of supporting general enclosure wiring when associating SES data with physical devices on a fibre channel loop with soft addresses.

The present invention concerns an apparatus comprising one or more enclosures and a controller. The one or more enclosures may include one or more drives. The controller may be configured to correctly map correlating addresses to the one or more drives.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to an embodiment of the invention, examples of which are illustrated in the accompanying drawings.

Figure 1:
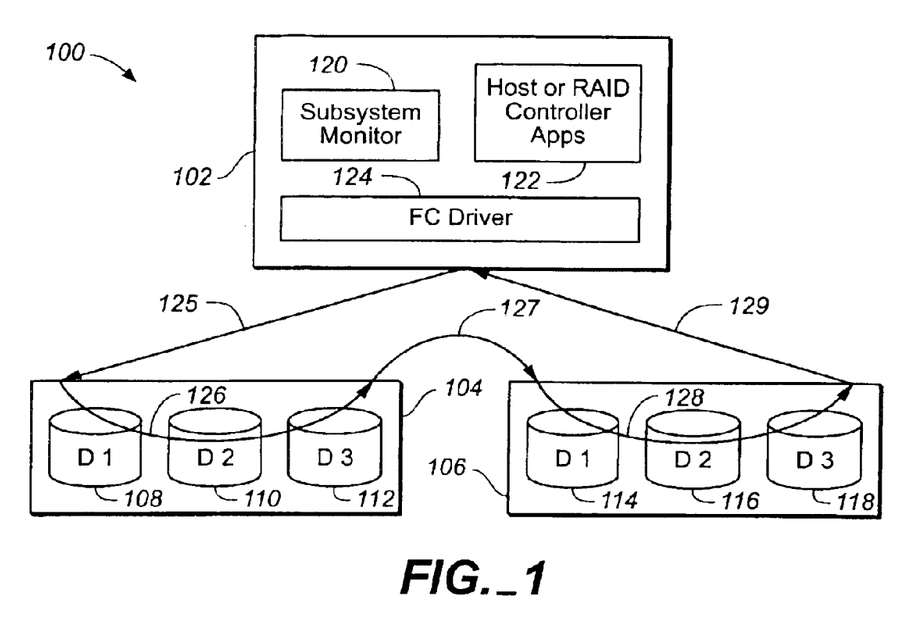
FIG. 1 depicts a block diagram illustrating a context for an embodiment of the present invention.

Referring now to FIG. 1, an embodiment of a storage system 100 of the present invention is shown. Storage system 100 may include a controller 110, such as a bridge controller, and at least one enclosure 120. Integrated within each enclosure 110 may be an enclosure services module 130. Enclosure services module 130 may provide information to bridge controller 110 regarding respective enclosure 120 such as the number of drives installed and their respective hard addresses. Each enclosure may include a number of drives. Enclosure 120 may each be implemented, in one example, as a drive tray.

Referring now to FIG. 1, a block diagram of a circuit or system 100 is shown illustrating a context for an embodiment of the present invention. The system 100 generally comprises a host portion (or circuit) 102 and a number of enclosures (or circuits) 104–106. In one example, host circuit 102 may be implemented as a host controller of the system 100. However, in alternative embodiments, host circuit 102 may be implemented as another appropriate number and/or configuration of controller(s) in order to meet the criteria of a particular implementation. Additionally, host circuit 102 may be required to account for (e.g. ignore) other host circuits (not shown) on a particular loop.

Enclosures 104–106 may each be implemented, in one example, as a drive tray. Enclosure 104 is shown comprising a number of drives 108–112. Similarly, enclosure 106 is shown comprising a number of drives 114–118. The number of enclosures 104–106, as well as the number of drives 108–112 and 114–118 in each drive portion may be varied accordingly to meet the design criteria of a particular implementation.

Host circuit 102 may include a monitor portion 120, a host portion 122, and a driver portion 124. In an embodiment of the invention, monitor portion 120 may be implemented as a subsystem monitor circuit; host circuit 122 may be implemented as a host or RAID controller application circuit; and driver portion 124 may be implemented as a fibre channel driver portion. However, monitor portion 120, host circuit 122 and driver portion 124 may each be implemented as other device types in alternative embodiments of the present invention to meet the criteria of a particular implementation.

The system 100 may illustrate the subsystem monitor 120 and FC driver 124 implemented in an application environment. A number of arrows 125–129 may represent redundant loops between the host controller 102 and enclosures 104–106. In one example, the arrows 125–129 may represent a loop of the system 100. Additionally, a particular direction of the arrows 125–129 may be reversed, changing the direction of the redundant loops and/or system loop 125–129. The loops 125–129 may illustrate a single redundant loop of the system 100. However, the loops 125–129 may implement other redundant loops (not shown) in order to meet the criteria of a particular implementation. The FC driver 124 generally holds information regarding the loop (e.g., loop map, AL_PAS, drives hard address). The subsystem monitor 120 may retain information from SCSI enclosure service (SES) data received from the drive portions 104–106 (e.g., how many drives, slot assigned addresses, etc.). Additionally, the system 100 may allow the presumption that the SES reported order and the physical loop order of the drives 108–112 and/or 114–118 in the trays 104–106 are either the same or the exact reverse order.

Data obtained from SES queries may indicate a number of drives present in each tray 104–106 (e.g., the drives 108–112 and/or 114–118). Additionally, the SES data may indicate corresponding FC hard addresses. The hard address for each of the slots is generally set via a connector on a mid-plane (not shown) of each tray 104–106. Each of the drives 108–112 and/or 114–118 may have knowledge of the hard address value by reading an appropriate hard address of the mid-plane of a current slot via an I/C port in the drive 108–112 and/or 114–118.

A SES processor (of the trays 104–106, not shown) may acquire and/or store information regarding hard address values for each slot (e.g., drives 108–112 and/or 114–118) of the trays 104–106. The SES processor may also return the hard address information to the host controller 102 via a SES query. Additionally, the controller 102 may obtain the hard addresses of the drives 108–112 and/or 114–118 via a FC extended link service (e.g., Address Discovery (ADISC)). If the controller 102 determines that all of the drives 108–112 and/or 114–118 on the loop 125–129 acquire assigned hard addresses during loop initialization, then controller mapping (to be discussed in connection with FIGS. 2 and 3) from the SES data to the FC drives found on the loop 125–129 may be trivial. For example, the controller 102 may simply match the hard addresses of the drives 108–112 and/or 114–118. Drive trays are generally manufactured such that the hard address of each drive slot is unique. Furthermore, some drive trays may have switch settings in order to set the range of hard addresses such that multiple trays may be on the same loop with no address conflicts. However, if two or more trays 104–106 on the loop 125–129 have the same switch setting, then the corresponding slots may have the same hard address. When the loop initializes the first set of drives (e.g., 108–112), the system 100 may obtain hard addresses of the drives 108–112 and the second and subsequent drives (e.g., 114–118, etc.) may be required to obtain "soft addresses" (e.g., addresses different than the hard addresses). The soft addresses may be implemented to prevent conflicting (e.g., duplicate) hard addresses. In such a scenario, the controller 102 may see two or more tray/slot positions with the same particular hard address value (e.g., x) Therefore, two or more drives may have the same hard address x. The system 100 is normally required to correctly match the appropriate trays/drives with allowable addresses.

The system 100 may implement proper correspondence based on the following data available to the controller 102 (i) SES data from an enclosure services monitor (ESM) that may list the number of drives installed and respective assigned hard addresses; (ii) whether or not a particular drive is bypassed from the loop 125–129 (e.g., contained within the SES data); (iii) a loop map that may list current addresses of the trays and/or drives on the loop 125–129; and/or (iv) a loop order of the trays and/or drives on the loop 125–129. In order for the system 100 to implement the proper correspondence, certain assumptions may be made. By designing the system 100 with the broadest assumptions, multiple drive trays from multiple vendors may be accommodated. Specific knowledge of how a particular drive tray is internally wired may not be required (e.g., a relative position of the ESM to the drive or a particular direction of the loop through the tray). Therefore, the system 100 may have broad applicability. However, in a particular implementation the present invention may leverage specific knowledge from a particular drive tray 104–106. An initial condition may be for each ESM to be adjacent to or in the middle of the drives 108–112 and/or 114–118 in a particular tray 104–106 on the loop map.

Figure 2:
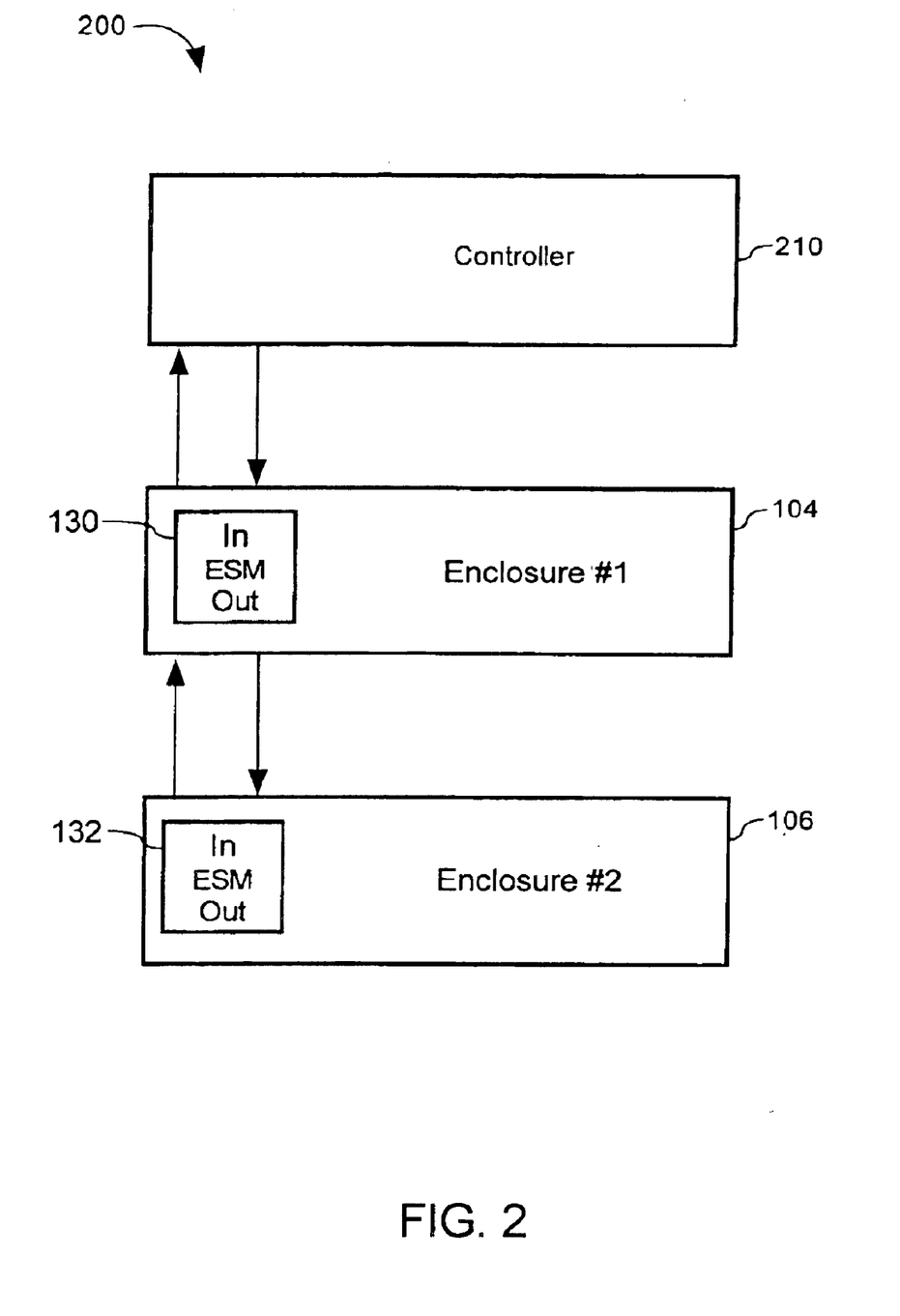
FIG. 2 depicts an embodiment of a storage system of the present invention.

Referring now to FIG. 2, an embodiment of a storage system 200 of the present invention is shown. Storage system 200 may include a controller 210, such as a bridge controller, and at least one enclosure 104–106. Controller 210 may include components and circuitry of host circuit 102 as shown in FIG. 1. Integrated within each enclosure 104–106 may be an enclosure services module 130–132. Enclosure services module 130–132 associated with each enclosure 104–106 respectively may provide information to controller 210 such as the number of drives installed and their respective hard addresses. Enclosure services module may include "in" and "out" ports from which other enclosures 104–106 and controller 210 may be interconnected.

Figure 3A:
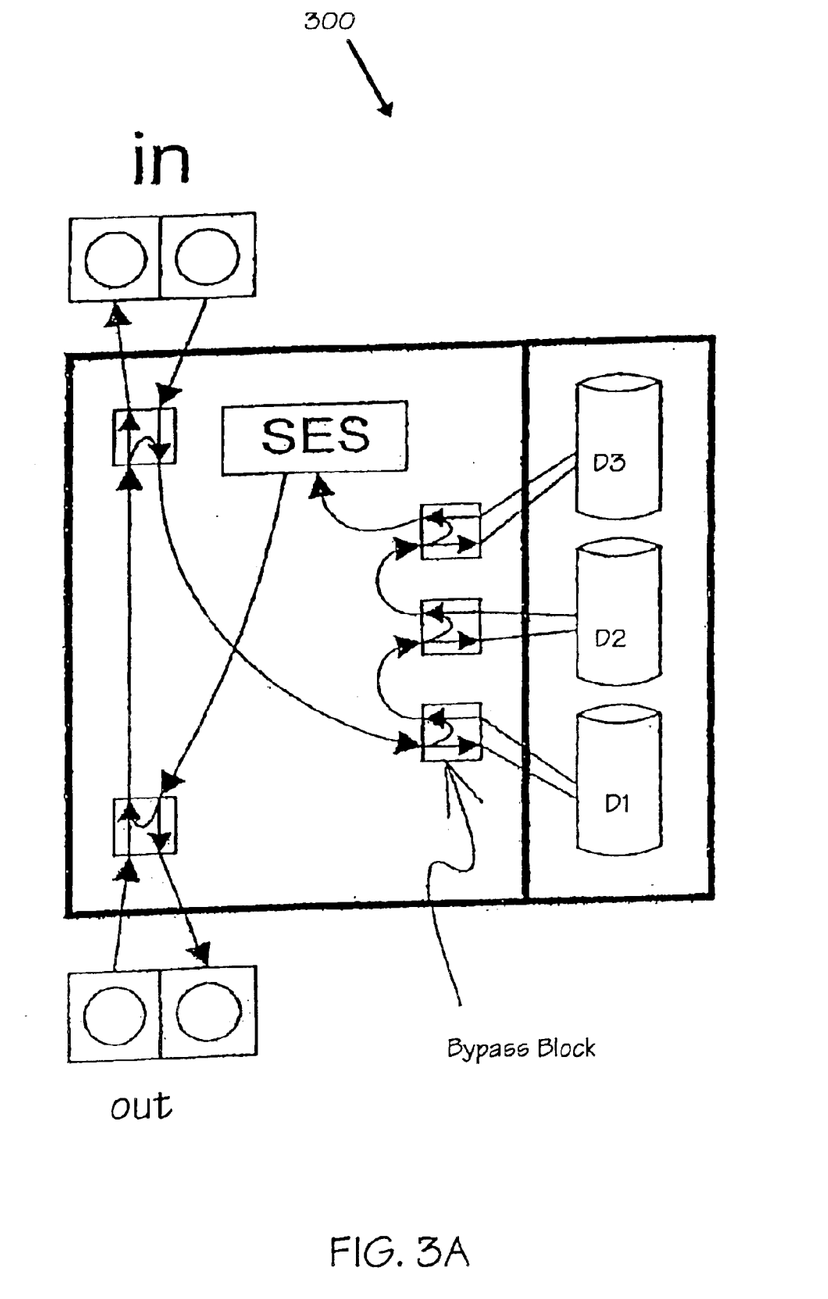
FIGS. 3A and 3B depict embodiments of internal wiring of enclosures in accordance with the present invention.
Figure 3B:
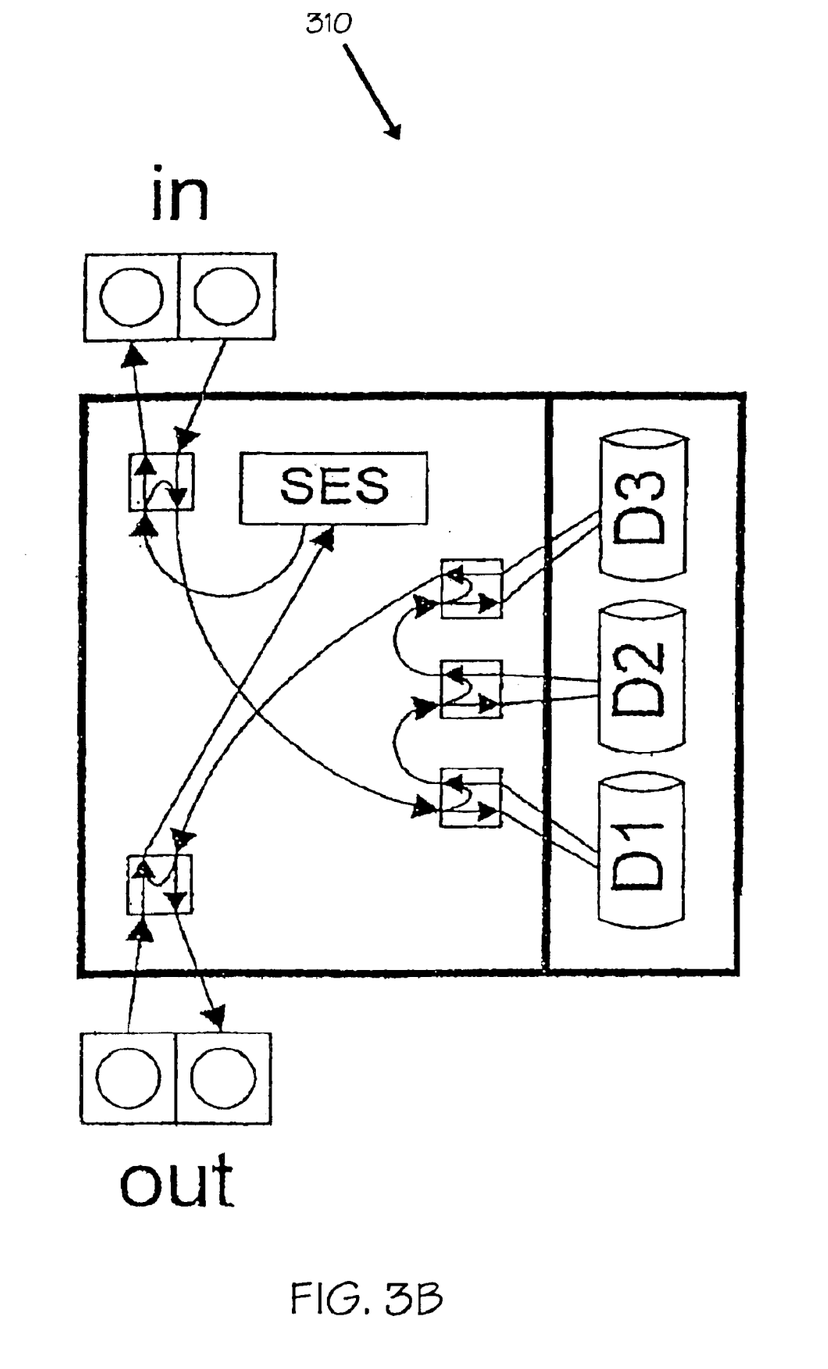

Referring now to FIGS. 3A and 3B, embodiments of enclosures 300, 310 are shown. Enclosure 300 shown in FIG. 3A utilizes internal wiring where the SES device may be in an "in-to-out" path. Enclosure 310 shown in FIG. 3B utilizes internal wiring where the SES device may be in an "out-to-in" path. Both types of wiring may be frequently utilized today in enclosure service modules. Included within each enclosure 300, 310 may be a bypass block, a SES device, and a number of drives. An advantageous aspect of the present invention is the ability to support the associating and mapping of devices with both types of internal wiring.

Figure 4:
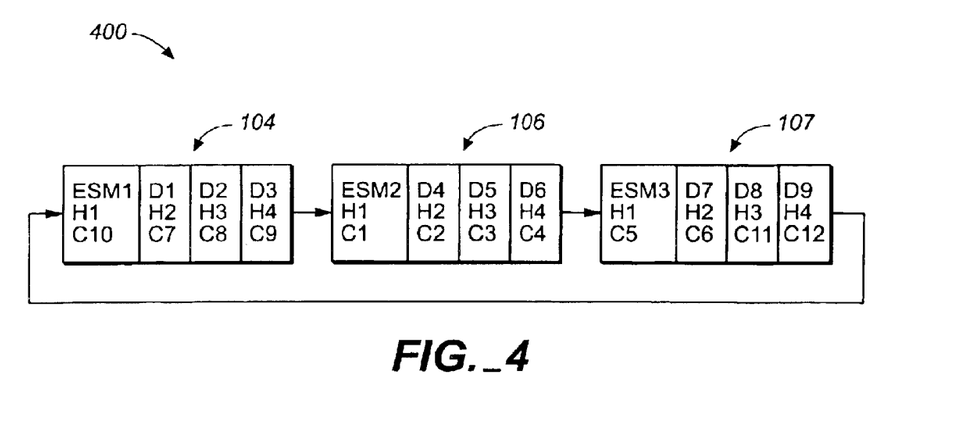
FIG. 4 depicts an embodiment illustrating the operation of the present invention.

Referring to FIG. 4, a block diagram of a method (or process) 400 illustrating an operation of the present invention is shown. The method 400 may rely on a process of elimination via a repetitive loop. For example, three drive trays 104–107 are shown with a corresponding enclosure service module (e.g., ESM1, ESM2, and ESM3). A number of drives of the system 400 may be numbered D1 through D9. Each of the ESMs may comprise a number of the drives D1–D9. For example, ESM1 may comprise the drives D1–D3, ESM2 may comprise D4–D6 and ESM3 may comprise the drives D7–D9. However, a particular number of ESMs, as well as drives may be varied in order to meet the criteria of a particular implementation. The hard addresses of each of the drives D1–D9 maybe labeled Hn, respectively. The drives D1–D9 may have duplicate hard addresses. A current address of each of the drives D1–D9 maybe labeled Cn. Additionally, each of the ESMs may be implemented with a hard address and current address, respectively. In the case of address conflicts, the current addresses Cn of the system 200 may be rather random. The current addresses Cn may comprise a loop map obtained from the FC loop initialization processes. Each drive D1–D9 may be queried to obtain a hard address Hn and current address Cn.

A detailed description of an operation of the system 400 is described below. If the tray ESM2 is being mapped first, then a match on the hard addresses H1 may occur in both the forward direction (e.g., the drives D4, D5 and D6) and reverse direction (e.g., the drives D1, D2 and D3). In the ESM2 mapping example, the method 300 may continue until the tray ESM1 may be mapped having only one match.

At that point, mapping of the tray ESM2 may allow only one match because the drives D1, D2 and D3 may be marked as already mapped. Additionally, the hard address H1 of the tray ESM3 may get a double match if mapped first. The method 400 may be initiated to notice an end of the loop. Therefore, the last ESMn may be required to associate with the last set of drives. However, a designer may have an implementation choice as to whether to merely retry the comparison ratio or implement extra logic in the comparison routine.

Figure 5:
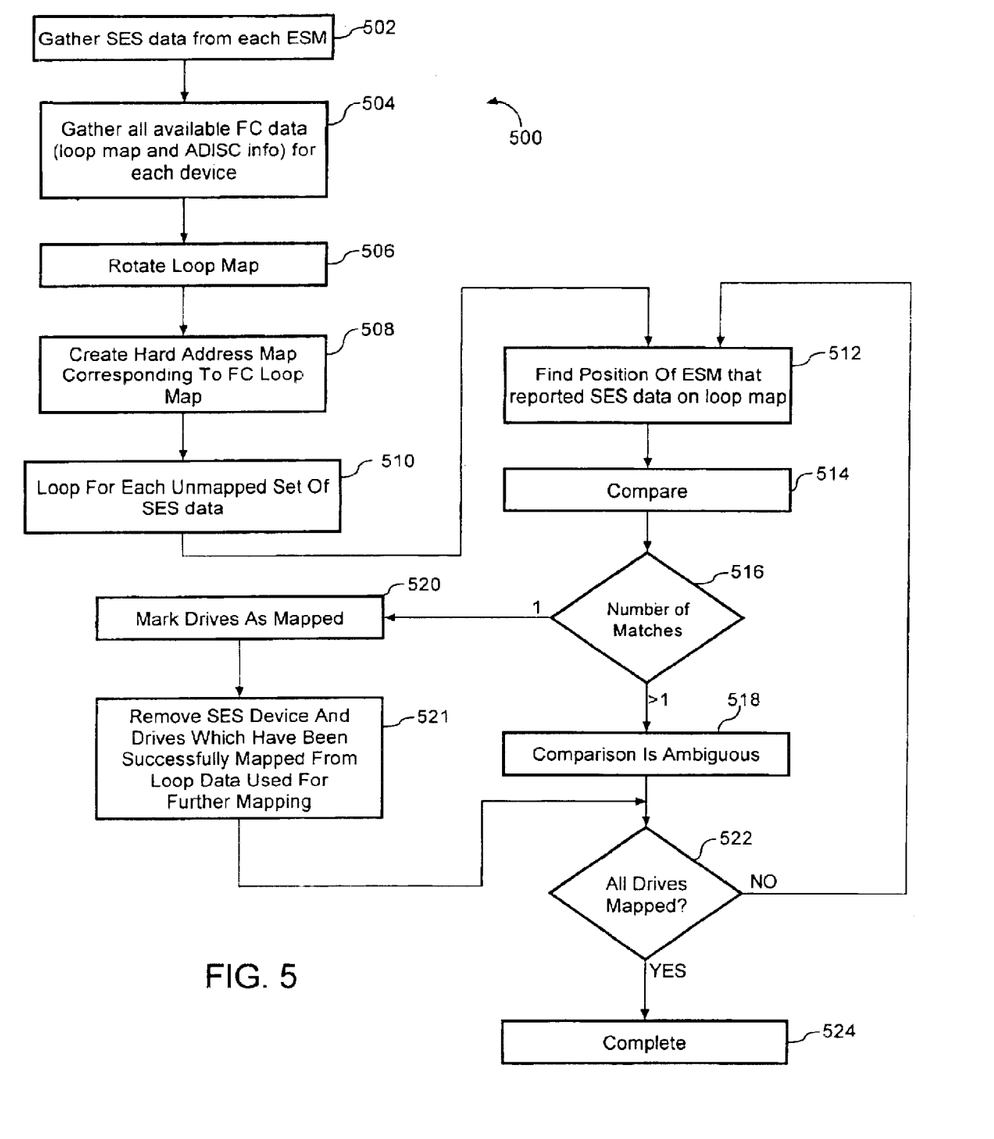
FIG. 5 depicts a flow diagram illustrating an embodiment of the operation of the present invention.

Referring to FIG. 5, a flow diagram of a method (or process) 500 is shown. The method 500 generally comprises a state 502, a state 504, a state 506, a state 508, a state 510, a state 512, a state 514, a decision state 516, a state 518, a state 520, a state 521, a decision state 522 and a state 524. The state 502 may be a gather SES data from each ESM state. The state 504 may be a gather all available data (e.g., loop map and ADISC information) for each device state. The state 506 may be a rotate loop map state. The state 508 may be a create hard address map corresponding to FC loop map state. The state 510 may be a loop for each unmapped set of SES data state. The state 512 may be a find position of ESM that reported SES data on the loop map state. The state 514 may be a compare state. The decision state 516 may determine and respond to a number of matches of the set of hard addresses to the SES data. If the number of matches is greater than one, the comparison is ambiguous and the method 500 may continue to the state 518. If the number of matches is one, the method 500 may continue to the state 520, where all the drives are marked as mapped. State 521 may remove SES device and drives which have been successfully mapped from loop data used for further mapping. The state 518 and the state 521 may continue to the decision state 522. The decision state 522 may determine if all drives are mapped. If all the drives are not mapped, the method 500 may return to the state 512. If all the drives are mapped, the method 500 may continue to the state 524. The state 524 may indicate a completion of the system 500. The state 522 may allow the system 500 to repeat the steps 512–520. The repeated steps 512–521 may allow the system 500 to provide correctly matched drives and drive tray slot positions.

A detailed description of an operation of system 500 may be as follows:

(A) in the state 502 the system 500 may gather SES data from each ESM;

(B) in the state 504 the system 500 may gather all available FC data (e.g., loop map and address discovery (ADISC) information) for each device;

(C) in the state 506 the system 500 may rotate a loop map such that the controller 102 may be at a beginning of the loop map (e.g., all drives and ESMs must follow in the loop map);

(D) in the state 508 the system 500 may create a corresponding loop map that may utilize the hard addresses of the loop devices (e.g., ESM and drives 108–112 and/or 114–118). A particular hard address may be obtained via address discovery (FC extended link service);

(E) in the states 510, 512 and 514 the system 500 may find the position of the ESM that may supply the SES data on the loop map and use the loop map position as an anchor to compare the hard addresses in the SES data to the hard addresses in the loop map. The comparison may be required to be done in the forward and reverse direction (e.g., cannot assume a direction of the loop) and may account for the possibility that the ESM anchor may be at the beginning, the end, or in the middle of the group of drives for each set of SES data describing a group of drives in the tray until all the drives have been mapped. Additionally, the loop may have to be repeated several times in order to map all the drives of the various loop devices. However, when performing the compare (e.g., the compare state 514) of the SES slot ID data to the hard address version of the loop map, the system 500 may be required to logically remove the ESM device loop map. For example, if the ESM location is in a predetermined portion (e.g., a middle position) of the drives, the ESM location may corrupt the compare. The compare may be corrupted, since the ESM location is generally not accounted for in the SES drive list data; and (F) in the states 516, 518, 520, 521 and 522 the system 500 may if only one match is found, mark the drives 108–112 and/or 114–118 as mapped and continue or if more than one match is found, mark the comparison as ambiguous and repeat the mapping stages 512–522.

The system 500 may provide correct drive mapping by eliminating ambiguous comparison results by repeating the steps 512–522.

Conventional methods for mapping drives with soft addresses to physical tray/slot positions utilize a position of the ESM device in the loop map as a delimiter for the drive trays. However, the system 100 (200, 400, or 500) may not assume a particular layout inside the device portions 104–107 (e.g., is the ESM in the middle, before, or after the drives) or the loop direction within the drive portion 104–107. The system 100 (200, 400, or 500) may not rely on the position of the ESM device in the loop map.

Since the system 100 (200, 400, or 500) may not assume a particular layout, an improvement may be achieved by implementation of state 521. In the mapping of enclosures where the internal wiring is of a type as shown in FIG. 3B, an error in the algorithm may appear without implementation of state 521. An advantage of the present invention may the ability to remove the error. If an enclosure mapping fails, mapping may proceed to the next enclosure and the failed mapping may be retried later in the process. If an enclosure is successfully mapped, it may be effectively removed from the loop data. For example, suppose two enclosures of FIG. 3B were connected as shown in FIG. 2. The loop map may be as follows:

1. D1(enclosure#1)
2. D2(enclosure#1)
3. D3(enclosure#1)
4. D1(enclosure#2)
5. D2(enclosure#2)
6. D3(enclosure#2)
7. SES(enclosure#2)
8. SES(enclosure#1)
9. Bridge Controller However, mapping of enclosure #1 may fail because the SES device of enclosure 1 may not be adjacent to its drives. Mapping of enclosure #2 may succeed. Upon successful mapping, the SES device and drives of enclosure #2 may be removed from loop data used for further mapping per state 521. Therefore, the following loop map may include:

1. D1(enclosure#1)
2. D2(enclosure#1)
3. D3(enclosure#1)
4. SES(enclosure#1)
5. Bridge Controller Upon a retry of the mapping of enclosure #1 may succeed because the SES device of enclosure #1 may be adjacent to its drives.

A conventional method of a physical address mapping with soft address device may be as follows:

←d1←d2←d3←d4←d5←d6←ESM←d7←d8←d9<d10←, where dn is a respective drive number, ESM is an arbitrary enclosure service module location and '←' indicates a direction of the loop. The conventional method represents the Fibre Channel (FC) order through a drive box. The conventional method may be illustrated in connection with FIG. 4. However, the conventional method will generate duplicate address matches. The conventional method will have duplicate address matches in both a forward and/or a backward direction (e.g., a first match on ESM1 or ESM2 and a second match on ESM1 or ESM2). For example, assuming that the conventional loop map is rotated in the direction of the controller (e.g., to the left), the conventional method will have a first match on ESM1 and a second match on ESM2. The conventional method assumes a particular layout of the ESM.

The system 100 (200, 400 or 500) may, in a preferred example, have a method implemented as follows:

→d1→d2→d3→d4→d5→d6→d7→d8→d9→d10→ESM→, where dn may represent a particular drive number, ESM may represent an enclosure service module location and '→' may indicate a loop map direction. The preferred method may start at an end ESM location instead of an arbitrary ESM location. The preferred method may be described in connection with FIG. 4. The ESM3 (of FIG. 4) may match addresses both a forward and a backward direction. Additionally, the preferred method may favor a match toward the start/end location ESM3 (e.g., the current addresses c5, c6, c11 and c12), since the ESM3 is at the start/end location of the loop map.

The preferred method of the present invention may have a reversed loop direction and a location of the ESM may be moved. The preferred method may allow for variances in bypass chips (e.g., change of a particular vendor of the chip) and/or other appropriate critical circumstances. The preferred method of the system 100 (200, 400, or 500) may allow changes in vendors of particular chips and/or critical circumstances (on the same loop). The conventional method implementing the ESM location as the delimiter, can not handle variations in chips and/or critical circumstances (such as loop direction and/or location of the ESM).

Furthermore, the system 100 (200, 400, or 500) may be implemented to manage dual loops and bypass status of drives. The bypassed drives may be listed in the SES data as present, but do not appear on the loop map. Additionally, drives that are bypassed on a single port may appear in the loop map for a first channel, but not for a second channel. The system 100 (200, 400, or 500) may be modified to accommodate such drives.

The system 100 (200, 400, or 500) may be implemented to associate device (e.g., small computer system interface (SCSI)) enclosure service data with physical devices on a fibre channel loop. The system 100 (200, 400, or 500) may associate (or map) the ESMs and/or a number of drives with soft addresses that may correctly match tray and/or slot locations of a drive to a device.

The system 100(200, 400, or 500) may describe an implementation in which the ESM device is an addressable SCSI device. However, the system 100 (200, 400, or 500) may be implemented in another appropriate type implementation. For example, the system 100 (200, 400, or 500) may be implemented when the ESM device is accessed via another SCSI device (e.g., in a pass-through manner). The fibre channel (FC) specification (e.g., the specification, SFF-8067, which is incorporated by reference in its entirety) describes such a standard for a drive to communicate with an ESM device.

In an alternate embodiment, the system 100 (200, 400, or 500) may apply to an SFF-8067 ESM implementation. However, the method of the present invention may be required to be modified. The method may be required to implement a device (e.g., drive) queried for the SES data instead of the ESM device as the anchor on the loop map.

Additionally, the system 100 (200, 400 or 500) may be modified to optionally implement addition information provided in a report bit in the SES data to determine which drive in the SES data reported the data. The report bit may allow the system 100 (200, 400, or 500) to have a generally more accurate anchor in the loop map for the comparison. The system 100 (200, 400, or 500) may be required to compare forward and backward. However, the system 100 (200, 400, or 500) may not be required to slide the comparison back and forth.

The function performed by the flow diagrams of FIGS. 4 and/or 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein described being merely an explanatory embodiment thereof, it is the intention of the following claims to encompass and include such changes.

What is claimed is:

1. A method for associating data with physical devices comprising the steps of:

(a) starting with a first SCSI enclosure service data location;

(b) implementing said first SCSI enclosure service data on a loop map location as an anchor;

(c) comparing one or more addresses;

(d) mapping correlating addresses in response to said comparison;

(e) marking one or more devices as mapped if a single match is found;

(f) marking the comparison as ambiguous if more than one match is found; and (g) removing a data associated with at least one of a SCSI enclosure service device and a drive from a loop map which have been successfully mapped whereby the loop map allows another mapping of a previously failed mapping of an enclosure.

2. The method as claimed in claim 1, wherein comparing of one or more addresses includes comparing in a forward or reverse direction.

3. The method as claimed in claim 1, further comprising:

accounting for a state when said anchor is at a beginning, an end, or in a middle of one or more devices.

4. A computer readable medium configured to store instructions for associating data with physical devices comprising the steps of:

starting with a first SCSI enclosure service data location;

implementing said first SCSI enclosure service data on a loop may location as an anchor;

comparing one or more addresses;

mapping correlating addresses in response to said comparison;

marking one or more devices as mapped if a single match is found;

marking the comparison as ambiguous if more than one match is found; and removing a data associated with at least one of a SCSI enclosure service device and a drive from a loop map which have been successfully mapped whereby the loop map allows another mapping of a previously failed mapping of an enclosure.

5. The computer readable medium as claimed in claim 4, wherein comparing of one or more addresses includes comparing in a forward or reverse direction.

6. The computer readable medium as claimed in claim 4, further comprising:

accounting for a state when said anchor is at a beginning, an end, or in a middle of one or more devices.

7. A method for associating data with physical devices comprising the steps of:

retrieving SCSI enclosure service data including hard addresses of devices;

implementing said first SCSI enclosure service data on a loop map location as an anchor;

retrieving a loop map for each device including hard addresses of devices;

creating a corresponding loop map utilizing a hard address of each device of a loop from said SCSI enclosure service data;

comparing hard addresses from the SCSI enclosure service data to hard addresses in the loop map;

mapping correlating addresses in response to said comparison;

marking one or more devices as mapped if a single match is found;

marking the comparison as ambiguous if more than one match is found; and removing a data associated with at least one of a SCSI enclosure service device and a drive from a loop map which have been successfully mapped whereby the loop map allows another mapping of a previously failed mapping of an enclosure.

8. The method as claimed in claim 7, wherein comparing of one or more addresses includes comparing in a forward or reverse direction.

9. The method as claimed in claim 7, further comprising:

accounting for a state when said anchor is at a beginning, an end, or in a middle of one or more devices.

* * * * *